(12) United States Patent
Stevens et al.

(10) Patent No.: US 9,241,427 B1
(45) Date of Patent: Jan. 19, 2016

(54) AIRFOIL TO PROVIDE DIRECTED COOLING

(71) Applicant: Seagate Technology LLC, Cupertino, CA (US)

(72) Inventors: Lon M. Stevens, Longmont, CO (US); Shawn J. Noland, Longmont, CO (US); Andrew J. Dunn, Colorado Springs, CO (US)

(73) Assignee: Seagate Technology LLC, Cupertino, CA (US)

( * ) Notice: Subject to any disclaimer, the term of this patent is extended or adjusted under 35 U.S.C. 154(b) by 50 days.

(21) Appl. No.: 14/447,248

(22) Filed: Jul. 30, 2014

(51) Int. Cl.
*G06F 1/16* (2006.01)
*H05K 7/20* (2006.01)
*H05K 7/14* (2006.01)

(52) U.S. Cl.
CPC .......... *H05K 7/20736* (2013.01); *H05K 7/1488* (2013.01)

(58) Field of Classification Search
USPC .............. 415/115, 175, 108, 200, 198.1, 178, 415/209.4, 144; 165/121, 64, 104.33, 247; 165/244, 178, 80.3; 307/20, 104; 248/178.1, 634, 636, 309.1; 361/679.03, 679.32, 679.33, 679.47, 361/679.54, 679.31, 679.02, 679.48, 361/679.26, 679.21, 679.37, 679.59, 361/679.34, 679.27, 679.43, 679.49; 345/174, 156, 157, 8, 158, 418, 428, 345/173, 660, 214, 690, 204, 179, 102
See application file for complete search history.

(56) References Cited

U.S. PATENT DOCUMENTS

| | | | |
|---|---|---|---|
| 6,141,213 A | 10/2000 | Antonuccio et al. | |
| 6,459,571 B1 | 10/2002 | Carteau | |
| 6,496,366 B1 | 12/2002 | Coglitore et al. | |
| 6,958,906 B2 | 10/2005 | Wu et al. | |
| 7,286,345 B2 | 10/2007 | Casebolt | |
| 7,305,458 B2 | 12/2007 | Hsue et al. | |
| 7,418,623 B2 | 8/2008 | Elliott et al. | |
| 7,536,586 B2 | 5/2009 | Ahmadian et al. | |
| 7,568,122 B2 | 7/2009 | Mechalke et al. | |
| 7,877,626 B2 | 1/2011 | Piszczek et al. | |
| 8,010,713 B2 | 8/2011 | Matumura et al. | |
| 8,296,406 B2 | 10/2012 | Kasperson et al. | |
| 2007/0230110 A1 | 10/2007 | Starr et al. | |
| 2009/0231800 A1 | 9/2009 | Franz et al. | |
| 2010/0146991 A1* | 6/2010 | Ilercil | F25B 21/02 62/3.3 |
| 2011/0128704 A1* | 6/2011 | Chang | H05K 7/20727 361/697 |
| 2012/0287571 A1* | 11/2012 | Santos | G06F 1/20 361/679.48 |
| 2012/0325127 A1 | 12/2012 | Adrain | |
| 2013/0151769 A1 | 6/2013 | Childs et al. | |
| 2013/0152376 A1 | 6/2013 | Corddry et al. | |
| 2013/0219101 A1 | 8/2013 | Hansen et al. | |
| 2014/0364048 A1* | 12/2014 | Milligan | H05K 7/20736 454/184 |

* cited by examiner

*Primary Examiner* — Hung Duong
(74) *Attorney, Agent, or Firm* — Hall Estill Attorneys at Law

(57) ABSTRACT

An airfoil to provide directed cooling of active elements, such as in a multi-device storage enclosure. In accordance with some embodiments, an apparatus includes a housing having opposing first and second ends. A first active element is mounted within the housing adjacent the first end, and a second active element mounted within the housing adjacent the second end. A fan assembly is mounted within the housing adjacent the second end to establish an airflow through the housing adjacent the first and second active elements for cooling thereof. An airfoil is mounted within the housing between the first and second active elements to accelerate and direct the airflow proximate the second active element.

20 Claims, 7 Drawing Sheets

AIRFOIL TO PROVIDE DIRECTED COOLING

SUMMARY

Various embodiments of the present disclosure are generally directed to the use of an airfoil to provide directed cooling of active elements, such as in a multi-device storage enclosure.

In accordance with some embodiments, an apparatus includes a housing having opposing first and second ends. A first active element is mounted within the housing adjacent the first end, and a second active element mounted within the housing adjacent the second end. A fan assembly is mounted within the housing adjacent the second end to establish an airflow through the housing adjacent the first and second active elements for cooling thereof. An airfoil is mounted within the housing between the first and second active elements to accelerate and direct the airflow proximate the second active element.

In further embodiments, an apparatus includes a multi-device storage enclosure housing with a first end configured for placement proximate a cold aisle and an opposing second end configured for placement proximate a warm aisle. A plurality of data storage devices are configured to store and retrieve user data from a host device, with the data storage devices being housed within the housing proximate the first end. A control board supports at least one integrated circuit (IC) device to control said storage and retrieval of the user data. The control board is housed within the housing proximate the second end. A fan assembly is mounted within the housing adjacent the second end and configured to establish an airflow through the housing. An airfoil is mounted within the housing between the data storage devices and the at least one IC device to accelerate and direct the airflow proximate the at least one IC device.

DETAILED DESCRIPTION

The present disclosure generally relates to directed cooling of active elements such as in a networked mass storage system.

Mass storage systems often employ multiple data storage devices which are operationally arranged to provide a relatively high data capacity memory storage space. The devices may be grouped together into a mass storage assembly (MSA) or other module that can be removably installed into a rack system (server cabinet).

Mass storage systems can take a variety of forms including servers, cloud storage modules, RAID (redundant array of independent discs) systems, extended memory systems (JBODs, or "just a box of drives"), etc. The storage systems can be accessed locally or over a network including a local area network (LAN), a wide area network (WAN), the Internet, etc. A storage enclosure can include various active elements such as storage devices, control boards, power supplies, fans, boot devices, etc.

While operable to provide highly efficient computer storage, conventional mass storage systems can be subject to a variety of limitations, including the inability to remove and replace individual active elements while maintaining the storage enclosure in a powered, operational condition ("hot swapping"), such as in the context of a service operation to replace a failed component or an upgrade operation where new and different performance elements are installed.

Accordingly, various embodiments of the present disclosure are generally directed to a directed cooling arrangement for use in a multi-device storage enclosure. As explained below, the storage enclosure may be configured with a housing adapted to be mounted within a rack system between a cold aisle (front) and a warm aisle (rear). The housing supports a number of active elements including multiple storage devices, power supplies, control boards, boot devices, etc.

One or more fan assemblies located adjacent the rear of the housing operate to establish a cooling airflow through the storage enclosure housing. As cool air is drawn into the front of the housing from the cold aisle, the airflow passes various storage devices and a midplane. An airfoil downstream from the midplane channels and directs the airflow adjacent an active element, such as one or more integrated circuit (IC) devices on a control board. The airflow then passes to the fan assemblies and is exhausted out the rear of the housing to the warm aisle.

In this way, effective cooling can be supplied to the intermediate portions of the interior of the housing without the need to locate cooling fans in this area. This can provide a number of operational advantages including reduced vibration and noise, and enhanced serviceability of the storage enclosure.

Figure 1:
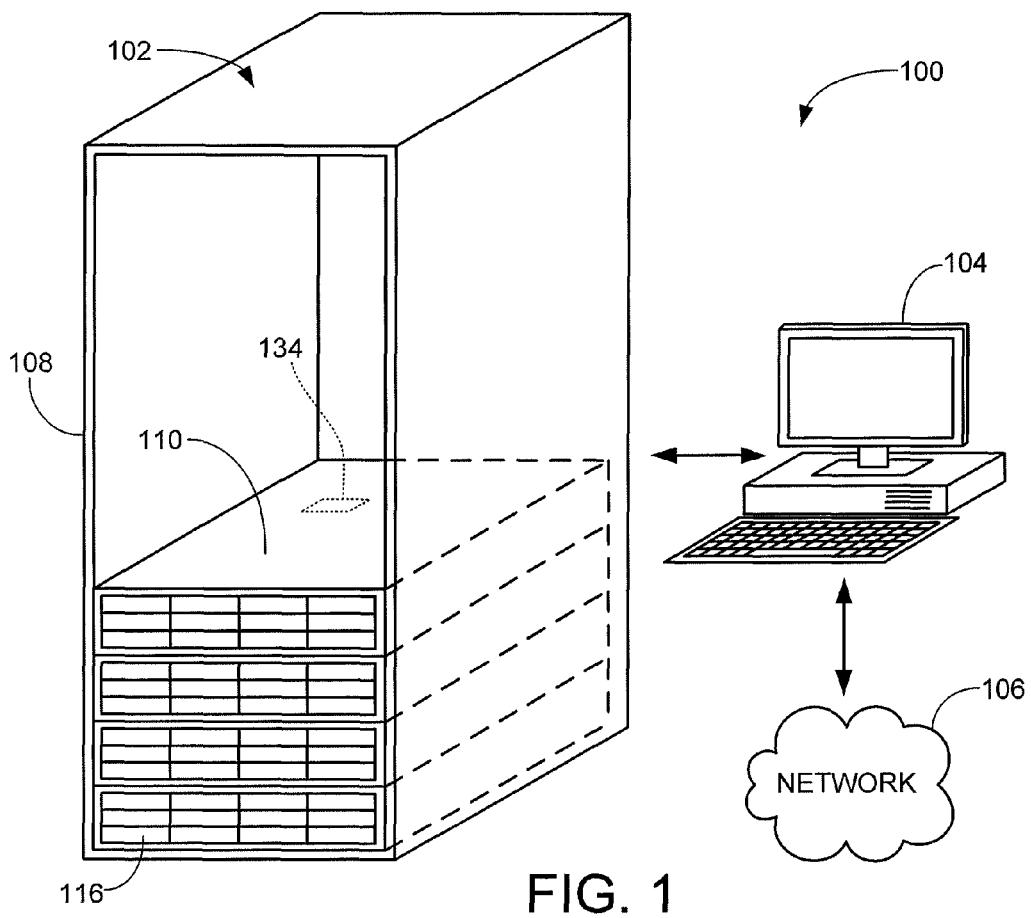
FIG. 1 is a functional representation of a networked mass storage system to illustrate a suitable operational environment for various embodiments of the present disclosure.

These and other features of various embodiments will become apparent beginning with a review of FIG. 1 which generally depicts a networked mass storage system 100 in accordance with some embodiments. The system 100 includes a storage assembly 102 coupled to a computer 104 which in turn is connected to a network 106. The computer 104 can take a variety of forms such as a work station, a local personal computer, a server, etc. The storage assembly 102 includes a server cabinet (rack) 108 and a plurality of modular storage enclosures 110.

In some embodiments, the storage rack 108 is a 42 U server cabinet with 42 units (U) of storage, with each unit comprising about 1.75 inches (in) of height. The width and length dimensions of the cabinet can vary but common values may be on the order of about 24 in.×36 in. Other sizes can be used. Each storage enclosure can be a multiple of the storage units, such as 2 U, 3 U, 5 U, etc. Fully populating the rack 108 with storage enclosures 110 can provide several Petabytes ($10^{15}$ bytes) of storage or more for the computer 104 and/or network applications.

Figure 2:
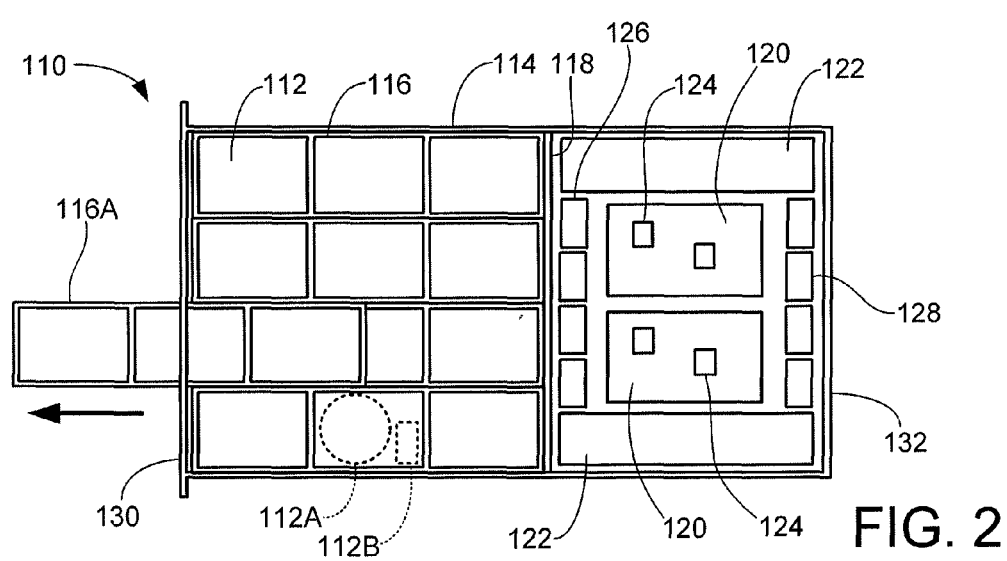
FIG. 2 is a top plan representation of a storage enclosure from FIG. 1.

An example configuration for a selected storage enclosure 110 is shown in FIG. 2. The storage enclosure 110 takes a 36/2 U configuration with 36 (3×4×3) data storage devices 112 in a 2 U form factor height storage enclosure housing 114. A variety of other configurations can be used including storage enclosures with a total of N drives where N=12, 16, 20, 24, 30, 32, 48, etc. Other heights can be used as well, such as 3 U, 4 U, 5 U, etc. While 1 U height storage enclosures are contemplated, it has been found in some cases that a thicker enclosure housing (e.g., 2 U or greater) provides improved structural stability and vibration response.

The storage devices 112 can take a variety of forms, such as hard disc drives (HDDs), solid-state drives (SSDs), hybrid drives, etc. Each storage device 112 includes a controller and computer memory to provide storage of user data, such as represented by rotatable disc memory 112A and controller 112B. In a cloud computing environment, data may be stored in the form of objects (partitions) of selected size and duplicated a number of times in different zones in different storage devices. It is contemplated that the storage devices 112 in FIG. 2 are 3.5 inch (in.) form factor HDDs with nominal length and width dimensions of 5.75 in.×4.0 in. Other styles and form factors of storage devices can be used, including but not limited to 2.5 in. form factor devices with nominal dimensions of 4.0 in.×2.88 in.

Retractable sleds 116 are used to secure multiple sets of the storage devices 112. The sleds can be individually extended and retracted from the housing 114, as shown for a selected sled 116A which has been partially extended from the housing 110. The sleds 116 may include sled electronics (not separately shown) to provide status indications and other control features during enclosure operation. While the sleds 116 are shown to support the storage devices 112 in a horizontal orientation (e.g., the length and width dimensions of the storage devices are parallel to the overall length and width dimensions of the storage enclosure housing 114), the sleds 116 can alternatively support the storage devices 112 in a vertical orientation (e.g., "on edge" so that the length and width dimensions of the storage devices are orthogonal to the length and width dimensions of the storage enclosure).

A midplane 118 extends in a transverse direction across the housing 114 to provide electrical interconnection paths for the various storage devices 112 and sled electronics. The midplane may take the form of a fixed multi-layer printed circuit board assembly (PCBA) with various electrical connectors, signal traces and vias to establish the necessary electrically conductive signal and power paths.

Alternatively, the midplane may take a flexible configuration in which flex circuits (e.g., cables, etc.) are used to maintain electrical interconnection with the storage devices and sleds. When a rigid midplane is used, extension of a sled (e.g., sled 116A) will generally result in the associated storage devices on the extended sled being powered down and disconnected from the system. Extension of a sled using a flexible midplane may allow the associated storage devices in the extended sled to remain powered up and operational.

Other active elements in the storage enclosure 110 of FIG. 2 include dual redundant control boards 120. The control boards 120 can take a variety of forms depending on the configuration of the storage enclosure 110, such as a server, a network switch, a router, a RAID controller, etc. The multiple control boards can be used in a dual mode operation to support failover and failback operations, or as a master/slave arrangement so that one control board provides control operations and the other board operates in a standby mode ready to take over operation should a fault be detected in the main control board.

Dual redundant power supplies are represented at 122. The power supplies 122 provide electrical power for the control boards 120 and other active elements of the storage enclosure 110 such as the storage devices 112. The electrical power is supplied at suitable voltage levels (e.g., 3V, 5V, 12V, etc.). Redundancy is provided such that each power supply 122 is rated to supply power for the entire enclosure, should the remaining power supply or supplies be temporarily taken off line.

The control boards 120 include one or more integrated circuit (IC) devices 124. The IC devices 124 generate significant amounts of heat during operation, requiring the use of active cooling to maintain the devices in a suitable temperature range. Similarly, the storage devices 112 can generate significant amounts of heat during operation depending upon system loading.

Accordingly, the storage enclosure 110 of FIG. 2 further incorporates a number of electrical fans. Forward located fans 126 are provisioned near the midplane 118 at an intermediate location within the storage enclosure housing 114, and rearward located fans 128 are provisioned at the rear of the storage enclosure housing 114. The respective fans 126, 128 may be nominally identical or may be provided with different operational characteristics.

Although not separately denoted in FIG. 2, it will be understood that vent apertures are provisioned in respective front and end facing surfaces 130, 132 of the storage enclosure housing 114. The apertures permit cooling airflow from the cold aisle to be drawn into the front of the housing 114 so as to flow adjacent the storage devices 112 and midplane 118, through the front fans 126, adjacent the control boards 120 and power supplies 122, and through the rear fans 128 out the rear of the housing to the warm aisle. The power supplies 122 may similarly incorporate fans to direct airflow through the power supply housing.

While such an arrangement can be operable, the location of the front fans 126 within the intermediate portion of the housing can present challenges from a servicing standpoint should one or more of the fans require replacement. As noted above, the use of the retractable sleds 116 permits relatively easy access to the individual storage devices 112. Similarly, the other active elements such as the control boards 120, the power supplies 122 and the rear fans 128 can be easily accessed through the rear side 132 of the housing 114.

Due to clearance and interconnectivity constraints, however, the front fans 126 are not easily accessible from either the front or rear sides 130, 132 of the housing 114. In the event of a failure of one or more of the front fans 126, one service option is to remove the rear fans 128 and one or both of the control boards 120 from the rear of the housing 114 in order to reach in, remove and replace the failed fan(s) 126. This requires the storage enclosure to be powered down for a significant amount of time and provides a risk that one or more of the active components may be damaged or reinstalled improperly.

Another service option is to mount the storage enclosure 110 on a set of rails, allowing the storage enclosure to be extended forward from the storage cabinet 108 (see FIG. 1). A service door (such as represented at 134 in FIG. 1) in the top cover of the storage enclosure housing 114 can then be opened to provide access to the forward fans 126. This approach is also associated with a number of difficulties, including the fact that the storage enclosure will likely need to be powered down prior to extension. Depending on the size and number of storage devices within the enclosure, the enclosure can also be unwieldy from a weight standpoint (some storage enclosures can weigh several hundred pounds), making such service operations difficult to carry out in a fast and efficient manner.

Figure 3:
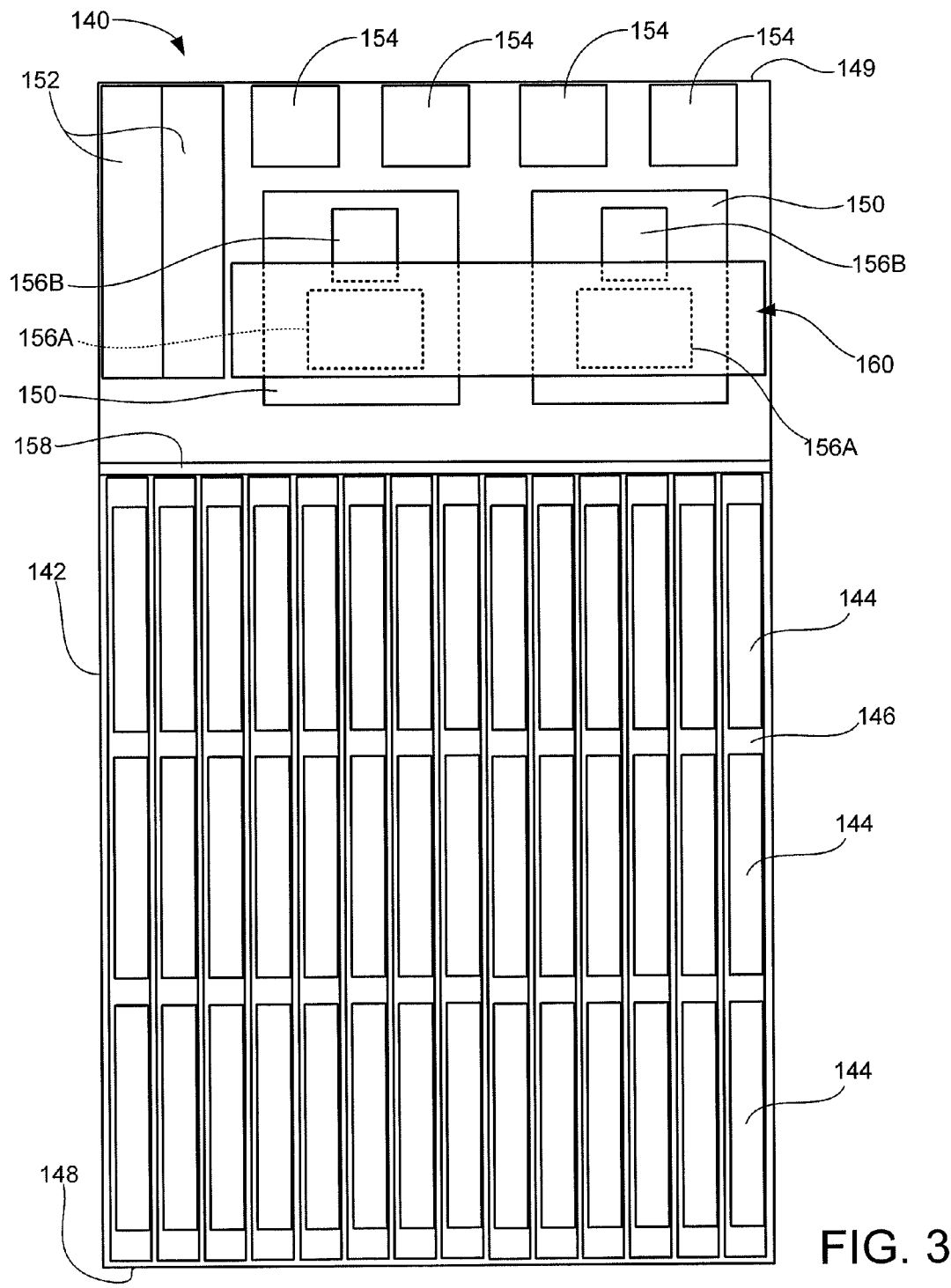
FIG. 3 is a storage enclosure with an airfoil to provide directed cooling in accordance with various embodiments.

Accordingly, various embodiments of the present disclosure are directed to an improved storage enclosure that uses a directed cooling arrangement to provide requisite airflow cooling for the enclosure without the need to locate fans in the intermediate portions of the storage enclosure housing. FIG. 3 is a top plan representation of a storage enclosure 140 constructed and operated in accordance with various embodiments. The storage enclosure 140 utilizes various active elements such as discussed above, and is configured for mounting in a storage cabinet such as 108 in FIG. 1.

The storage enclosure 140 includes an enclosed storage housing 142. In some embodiments, the storage housing 142 has a 3 U height and houses a total of 42 data storage devices 144 (14×3×1). The data storage devices 144 are contemplated as comprising 3.5 in form factor HDDs, although other styles, types, sizes, numbers and orientations of storage devices can be used.

The storage devices are arranged in a vertical orientation, with groups of three (3) devices being supported by individual sleds 146. A total of 14 sleds are provided, with the sleds being configured for sliding retraction from a front surface 148 of the housing to provide access to the devices 144 during service events as discussed above.

Access is provided from a rear surface 149 of the housing 142 to facilitate servicing of other active elements of the storage enclosure 160, including dual redundant control boards 150, power supplies 152 and fans 154. The fans 154 are electrically powered fans with rotatable fins configured to establish an airflow at a selected rate, and collectively form a fan assembly. Each of the control boards 150 electrically and mechanically support a number of active elements, such as IC devices 156A and 156B. The control board can operate as a controller to control the storage and retrieval of data from the storage devices 144 with a host device.

A midplane 158 extends in a transverse direction across a width direction of the housing 142 and provides electrical and mechanical interconnection of the various active elements of the enclosure 140. The midplane 158 is a rigid midplane having a multi-layer printed circuit board assembly (PCBA) which supports various connectors and conductive traces (not separately shown) to interconnect the various active elements. Other configurations, including flexible midplanes, can be used.

It will be appreciated that a number of other elements can be incorporated into the storage enclosure 140 such as sled electronics, monitoring circuits, LED status indicators, cabling, boot devices, mechanical support structures, etc. Such elements have been omitted from FIG. 3 for simplicity of illustration.

Of particular interest in FIG. 3 is an airflow diverter 160. The diverter, also referred to herein as an airfoil, operates to provide directed cooling for the storage enclosure 140 during operation in a manner discussed below. The airfoil 160 generally comprises a planar member which extends in a transverse direction across the width of the storage enclosure housing 142 downstream from the midplane 158. The airfoil 160 can be formed of any suitable rigid material such as sheet metal, plastic, etc.

Figure 4:
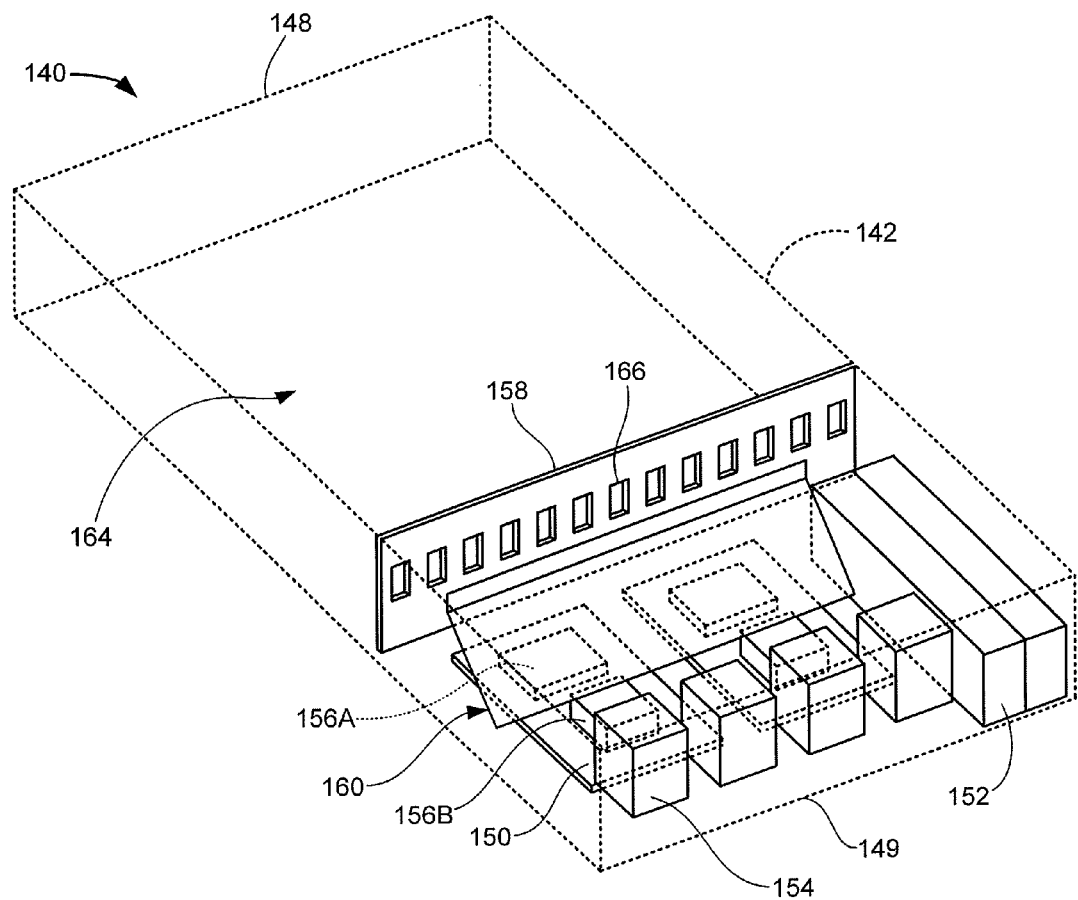
FIG. 4 is an isometric depiction of the storage enclosure of FIG. 3.
Figure 5:
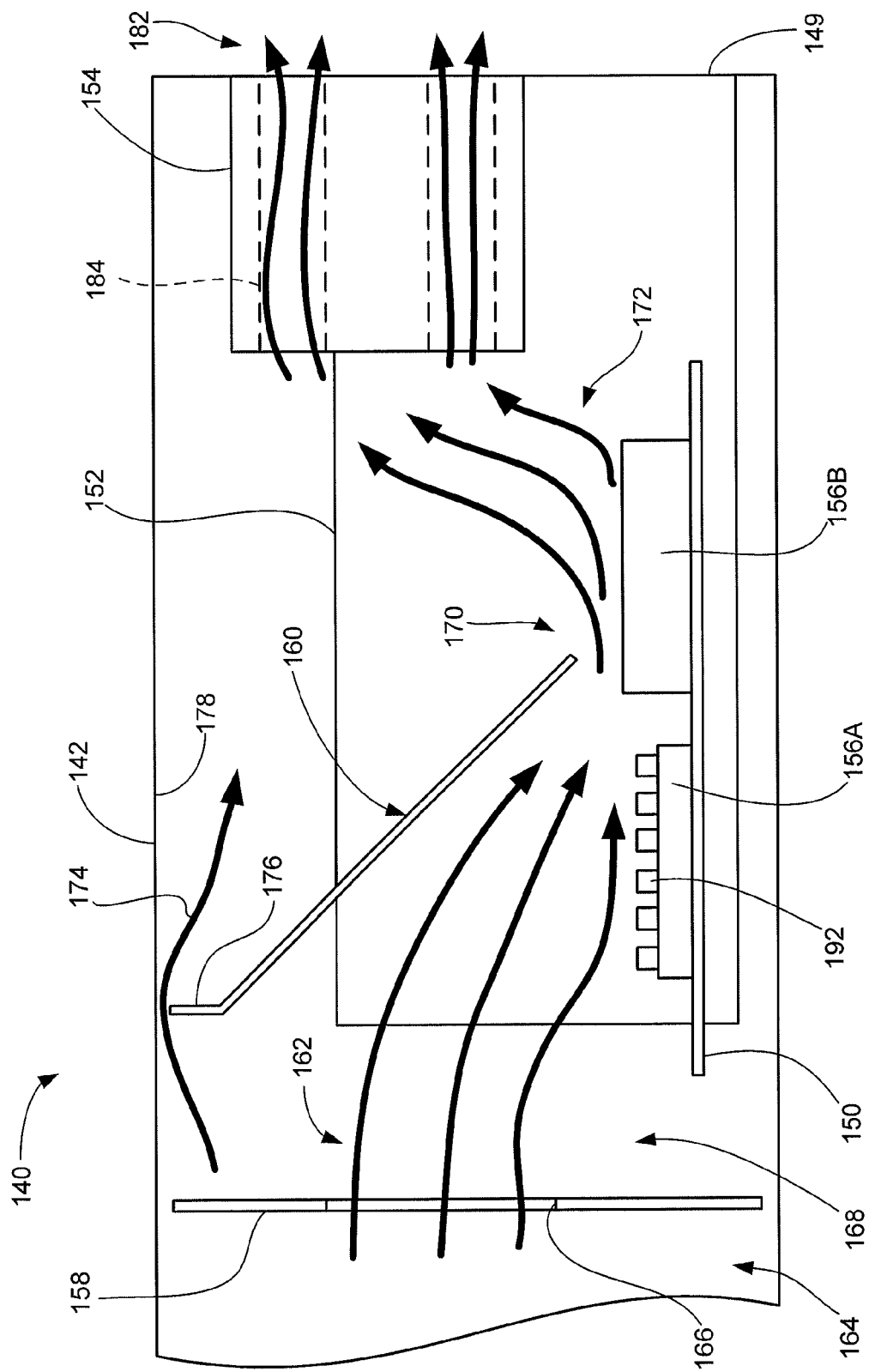
FIG. 5 is a side elevational depiction of operation of an airfoil of the storage enclosure in some embodiments.

As further shown in FIGS. 4 and 5, the airfoil 160 extends at a selected skew angle (e.g., an acute angle) with respect to the control boards 150 to accelerate and direct airflow established by the fans 154 proximate the control boards. In one embodiment, the angle of the airfoil 160 is nominally 45 degrees with respect to a length direction of the housing 142 from the first end 148 to the second end 149. The forced airflow enhances the cooling of the IC devices 156A and 156B. As desired, the airflow can be directed toward other active elements of interest.

Arrows 162 in FIG. 5 represent airflow that enters the enclosure housing 142 through apertures (not shown) in the front facing surface 148 of the housing. This airflow 162 passes between the adjacent sleds 146 to provide cooling for the storage devices 144 (FIG. 3). The storage devices 144 and sleds 146 have been omitted from FIGS. 4-5 for clarity, but are housed within storage device zone 164 in the manner set forth in FIG. 3.

The airflow 162 continues past the storage devices 144 and flows through spaced-apart apertures 166 that extend through the midplane 158 (FIG. 4) to pass into an airfoil entry zone 168 (FIG. 5). The airflow passes along the length of the airfoil 160 to an airfoil exit zone 170, and accelerates along the way due to the continuous decrease in the cross-sectional area available to the airflow caused by the airfoil 160. At this point, the accelerated airflow (represented by arrows 172) is jetted toward and across IC device 156B to provide cooling thereof.

Depending on the configuration of the storage enclosure 140, some additional airflow 174 may bypass the airfoil 160 and flow to other areas within the housing 142 downstream from the midplane 158. The airflow 174 may pass between a top flange 176 of the airfoil 160 and an interior surface 178 of the housing 142 through a gap defined therebetween. Regardless, the fans 154 will pull an exhaust airflow 182 through an annular fan channel 184 established by rotation of fins (not separately shown) of the fan out the rear surface 149 of the housing 149 to the warm aisle.

The number, style and arrangement of fans can be varied as required to establish the desired airflow through the enclosure. In one embodiment, the fans 154 are dual-fin fans having an overall size of nominally 60 millimeters, mm×60 mm×54 mm and are commercially available from Sanyo Denki Co. LTD, Tokyo, Japan.

Figure 6:
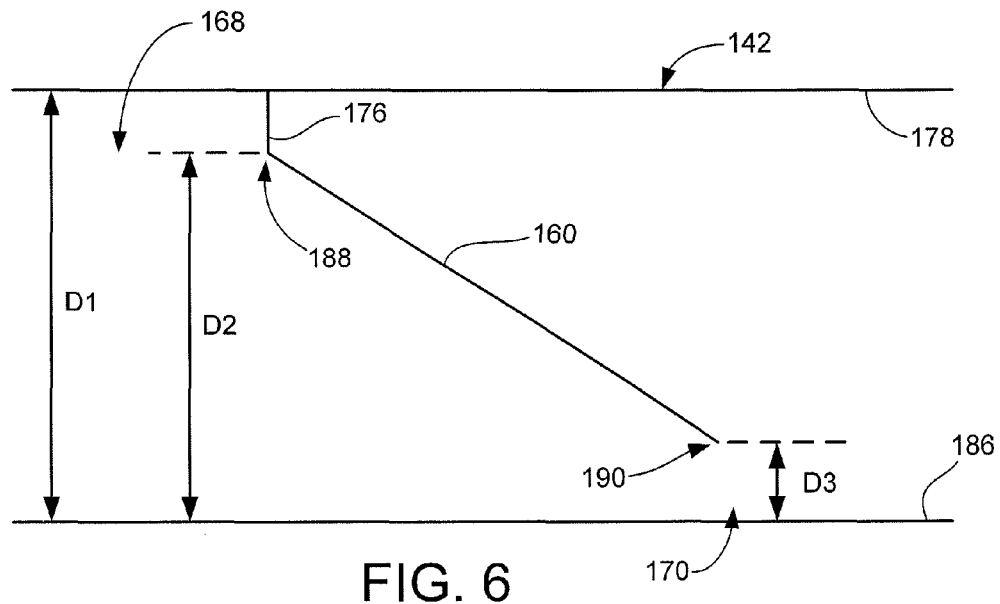
FIG. 6 is a schematic representation of the airfoil of FIG. 5.

FIG. 6 is a schematic depiction of the airfoil 160 of FIG. 5. The airfoil entry zone 168 upstream of the airfoil 160 has an overall height of distance D1 from a lower base surface 186 (e.g., lower surface of housing 142) to the upper interior surface 178. The airfoil entry zone 168 may be a zone of relatively low pressure as airflow is pulled through the respective midplane apertures 166.

A first end 188 of the airfoil at the entry zone 168 is a second, smaller distance D2 from the base surface 186. An opposing, second end 190 of the airfoil at the exit zone 170 is a third smaller distance D3, where D3 is significantly smaller than D2 (e.g., D2<<D3). Moreover, the base surface at the exit zone may be a top surface of the control board 150 and/or components disposed thereon, such as the IC device 156B. This substantial narrowing of the clearance distance from D2 to D3 results in the rapid acceleration of the airflow.

Returning again to FIG. 5, it will be noted that the control board 150 extends under the airfoil 160 so that the upstream IC device 156A is located between the entry and exit zones 168, 170 whereas the downstream IC device 156B is located adjacent the exit zone 170. It is contemplated albeit not necessarily required that the downstream device 156B dissipates heat at a greater rate than the upstream device 156A, so that the greater airflow velocity proximate the downstream device 156B can help to dissipate this generated heat. As desired, heatsink devices such as 192 on upstream device 156A can be used to increase the surface area and hence, convective cooling of the devices.

The airfoil 160 as configured in FIGS. 3-6 is configured to generally direct the flow of the airflow 172 exiting the airfoil 160. However, as desired the airfoil and associated components can be arranged to induce turbulence in the airflow in the vicinity of active elements that generate relatively large amounts of heat. As will be recognized by those skilled in the art, turbulent airflow tends to increase heat transfer between the active element and the airflow. However, such turbulence comes at the price of increasing overall pressure losses within the system and can reduce the volume of airflow passing through the system. Accordingly, the directed cooling arrangements disclosed herein can be readily adapted to a given application to provide proper levels of heat dissipation, pressure loss and volumetric flow as required.

Figure 7A:
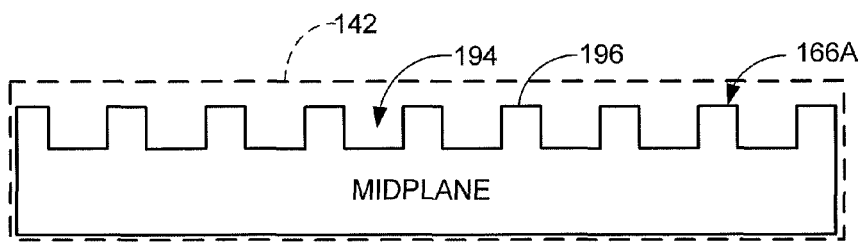
FIGS. 7A-7C illustrate alternative configurations for a midplane of the storage enclosure in accordance with some embodiments.
Figure 7B:
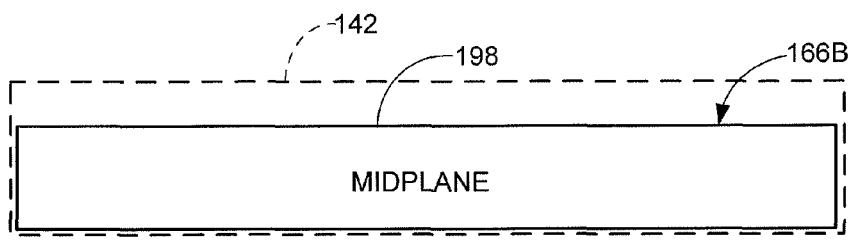
Figure 7C:
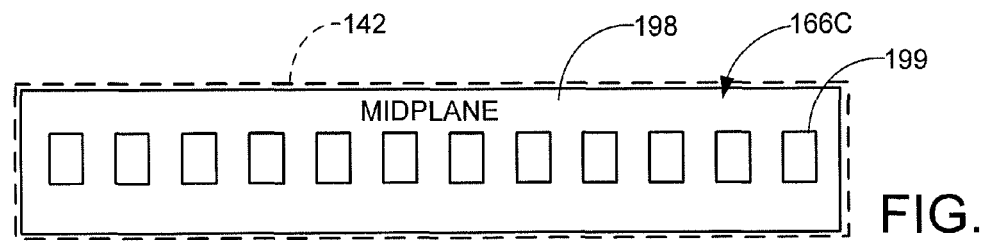

FIGS. 7A-7C illustrate alternative configurations of midplanes 166A, 166B and 166C, respectively, that can be used in the storage enclosure 140. The midplane 166A in FIG. 7A has a "turret" configuration with apertures 194 extending between adjacent projections 196 to allow airflow to pass therethrough. The overall height of the midplane 166A can be adjusted to facilitate passage of airflow from the data storage device zone 164 at the desired rate. The midplane 166B in FIG. 7B has a "low wall" configuration with a shortened upper surface 198 established to facilitate passage of airflow from the data storage device zone 164 at the desired rate. FIG. 7C shows yet another midplane 166C with a number of spaced apart apertures 199 extending through a medial extent of the midplane to admit airflow from the storage devices. Other configurations are contemplated and will readily occur to the skilled artisan in view of the present disclosure. For example, as noted above, flexible midplanes formed of various flexible components (e.g. cables, flex circuits, etc.) can be used so that a rigid PCBA is not necessarily required.

Figure 8A:
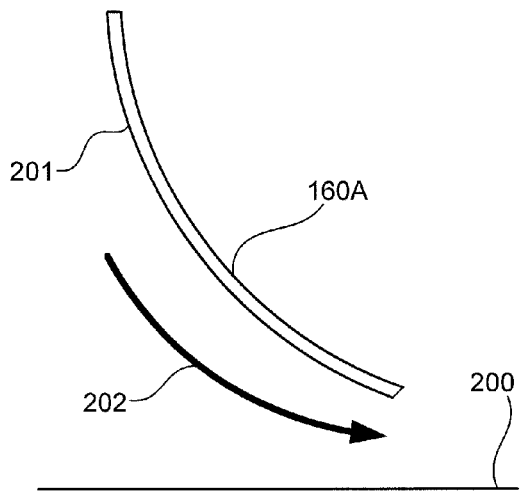
FIGS. 8A-8C provide alternative configurations for the airfoil in accordance with some embodiments.
Figure 8B:
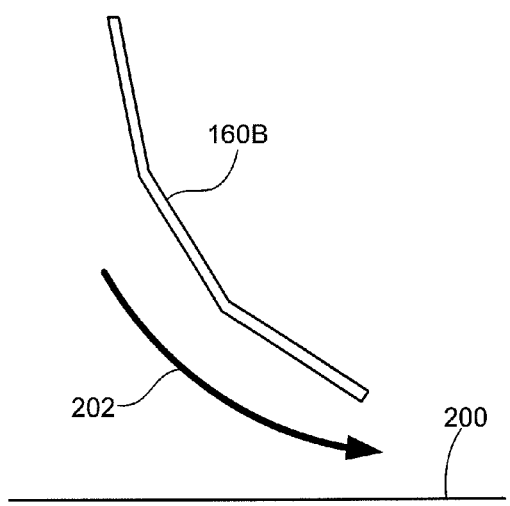
Figure 8C:
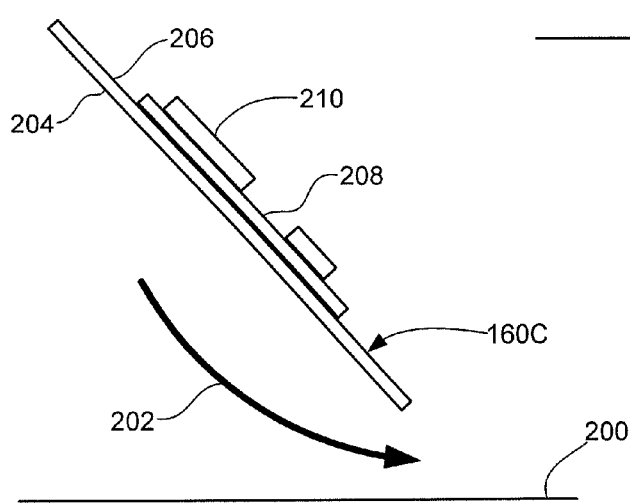

FIGS. 8A-8C show various alternative airfoil configurations that can be used with the storage enclosure 140 to provide directed cooling as discussed herein. FIG. 8A shows an airfoil 160A adjacent a base surface 200 and having a continuously curvilinear planar surface 201 to channel an airflow 202 between the airfoil and the base surface. FIG. 8B shows an airfoil 160B with opposing planar surfaces characterized as discrete linear segmented surfaces.

FIG. 8C shows a linear airfoil 160C generally similar to the airfoil 160 discussed above and having opposing linear planar surfaces 204, 206. The surface 204 contactingly engages the airflow 202 to channel the airflow as discussed above, while surface 206 contactingly supports an active element of the enclosure 140 characterized as a control board (PCBA) 208 supporting one or more IC devices 210. The control board 208 can be used to provide control and status functions for the enclosure, such as monitoring, temperature and vibration measurements, output control for LED indicators for the various sleds 146, etc.

In this way, the outer angled surface of the airfoil (e.g., surface 206) can be used as a convenient mounting surface for various elements within the enclosure 140. It is contemplated that such components (e.g., board 208) may generate heat at a rate substantially less than the elements at which the airflow 202 is directed, and therefore may require less airflow to maintain the components at a suitable operational temperature. Some cooling of the components mounted to the airfoil may occur as a result of conductive cooling as heat passes through the airfoil to the airflow 202, as well as through natural convection and radiation.

Figure 9:
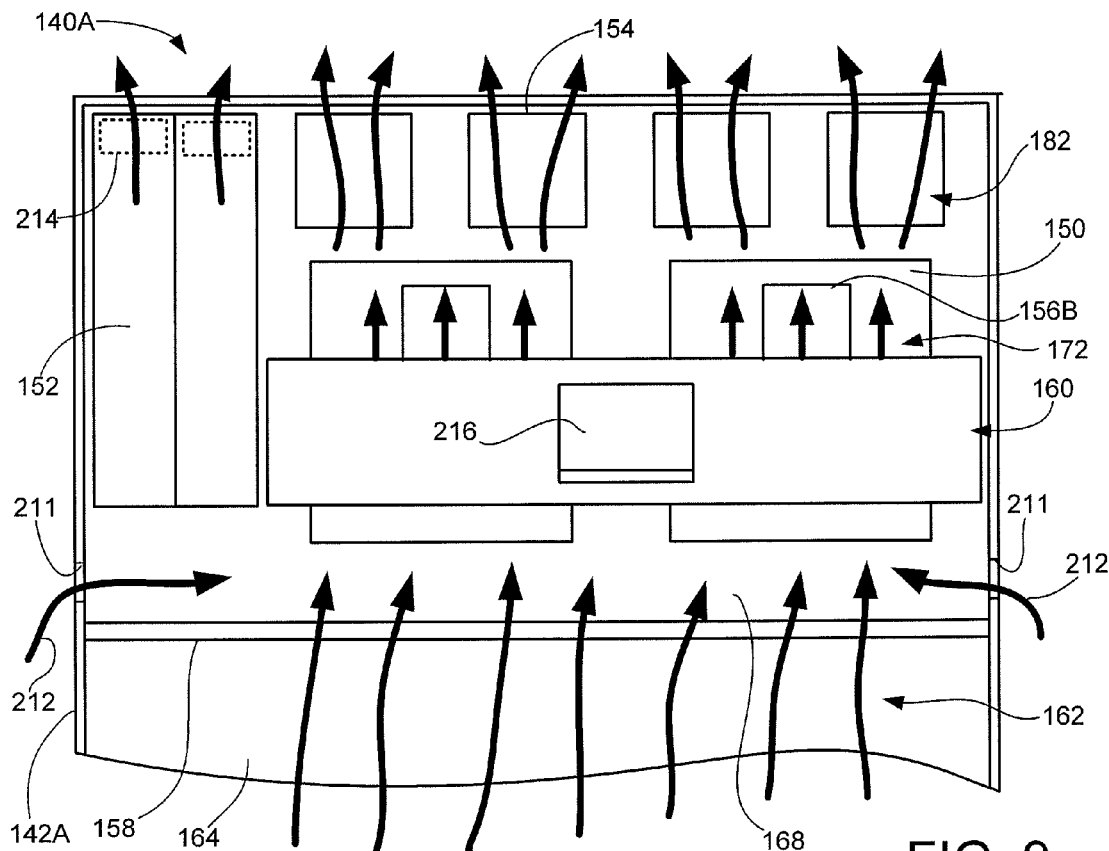
FIG. 9 illustrates another configuration of the storage enclosure which uses airflow ingress apertures in the storage enclosure housing.

FIG. 9 depicts another storage enclosure 140A substantially similar to the enclosure 140 discussed above. Similar elements are provided with the same reference numerals. The storage enclosure 140A has a storage enclosure housing 142A with apertures 211 fluidically coupled to the airfoil entry zone 168. This allows additional airflow 212 to enter the housing between the midplane 158 and the airfoil 160, thereby decreasing the temperature of the airflow through the enclosure. As desired, fans such as 214 can be incorporated into the power supplies 152 to further enhance the airflow through the enclosure. Generally, it will be recognized that adding airflow slots such as 211 will tend to slightly increase the pressure in this section of the housing 142A. In turn, this tends to reduce the amount of airflow adjacent the HDDs in zone 164 since some air is drawn in through the apertures 211 rather than through the front of the enclosure. This technique can be thought of as "robbing Peter to pay Paul"; greater cooling is provided at the rear of the enclosure as compared to the front of the enclosure in relation to the airflow introduced through the slots.

Figure 10:
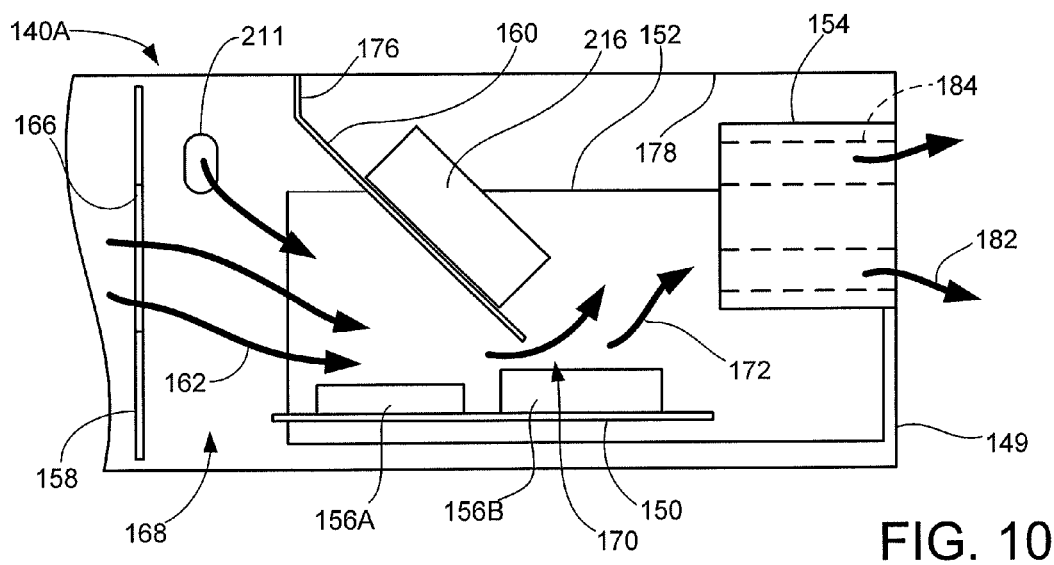
FIG. 10 is a side view representation of the storage enclosure configuration of FIG. 9.

FIG. 10 is an elevational representation of aspects of the storage enclosure 140A. An active element in the form of a boot device 216, such as a 2.5 in form factor HDD, is mounted to the outer surface of the airfoil 160. It will be noted that the airfoil flange 176 extends to contactingly engage the lower surface 178 of the housing 142A, thereby sealing off the entry zone 168 and forcing substantially all of the inlet airflow, apart from the airflow passing through the power supplies 152, to pass adjacent the airfoil 160 and through the exit zone 170.

The directed cooling arrangements as embodied herein can provide a number of benefits through active directed cooling of particular elements within a storage enclosure. The use of airfoils as disclosed herein can enhance airflow draw without the need to locate fans in the medial portions of the storage enclosure housing. However, it will be appreciated that one or more fans may be placed between the midplane and the airfoil as desired. Similarly, while the airflow as embodied herein has been described as being placed between a plurality of data storage devices (e.g., 144) and a control board device (e.g., 156A), it will be appreciated that the airfoil can be adapted for placement between any suitable first and second active elements to accelerate and direct airflow proximate the second active element.

For purposes herein, the term "airfoil" and the like will be understood consistent with the foregoing discussion and as understood by the skilled artisan as a stationary member that reduces an available cross-sectional area available to an airflow, and therefore excludes a fan or elements thereof.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a housing having opposing first and second ends;
a first active element mounted within the housing adjacent the first end;
a second active element mounted within the housing adjacent the second end;
a fan assembly mounted within the housing adjacent the second end and configured to establish an airflow through the housing adjacent the first and second active elements for cooling thereof; and
an airfoil mounted within the housing between the first and second active elements to accelerate and direct the airflow proximate the second active element.

2. The apparatus of claim 1, further comprising a midplane disposed between the first active element and the airfoil, the midplane configured to establish electrical interconnection between the first and second active elements.

3. The apparatus of claim 2, wherein the midplane comprises a rigid printed circuit board assembly (PCBA) mounted in a transverse direction across a width of the housing with at least one through aperture to facilitate passage of the airflow therethrough to the airfoil.

4. The apparatus of claim 1, wherein the first active element is a data storage device and the second active element is an integrated circuit (IC) device.

5. The apparatus of claim 4, wherein the data storage device is a first data storage device mounted to a sled which supports at least one additional second data storage device nominally identical to the first data storage device, the sled retractable through the first end of the housing to facilitate a service event upon at least the first or second data storage device.

6. The apparatus of claim 1, wherein the airfoil comprises a rigid element having opposing first and second planar surfaces, the first planar surface extending at an acute angle with respect to a length direction of the housing from the first end to the second end to channel and accelerate the airflow toward the second active element.

7. The apparatus of claim 6, wherein the second planar surface is nominally parallel to the first planar surface.

8. The apparatus of claim 7, further comprising a third active element supported by the second planar surface.

9. The apparatus of claim 6, wherein the first planar surface is a linear surface.

10. The apparatus of claim 6, wherein the first planar surface is a continuously curvilinear surface.

11. The apparatus of claim 6, wherein the first planar surface is a discrete linear segmented surface.

12. The apparatus of claim 1, wherein the housing is a rectilinear housing of a multi-device storage enclosure, the first active element is a data storage device having a controller and a memory, and the IC device is a controller which directs a transfer of data between the memory of the data storage device and a host device.

13. The apparatus of claim 12, further comprising a power supply which supplies electrical power to the data storage device and the controller, wherein the airfoil is disposed adjacent the power supply.

14. The apparatus of claim 12, wherein the at least one fan assembly comprises a first fan and a second fan adjacent the first fan aligned along the second end of the housing.

15. An apparatus comprising:
a multi-device storage enclosure housing comprising a first end configured for placement proximate a cold aisle and an opposing second end configured for placement proximate a warm aisle;
a plurality of data storage devices configured to store and retrieve user data from a host device, the data storage devices housed within the housing proximate the first end;
a control board supporting at least one integrated circuit (IC) device to control said storage and retrieval of the user data, the control board housed within the housing proximate the second end;
a fan assembly mounted within the housing adjacent the second end and configured to establish an airflow through the housing; and
an airfoil mounted within the housing between the data storage devices and the at least one IC device to accelerate and direct the airflow proximate the at least one IC device.

16. The apparatus of claim 15, further comprising a midplane disposed between the first active element and the airfoil, the midplane configured to establish electrical interconnection between the data storage devices and the control board, the midplane comprising a rigid printed circuit board assembly (PCBA) mounted in a transverse direction across a width of the housing with at least one through aperture to facilitate passage of the airflow therethrough to the airfoil.

17. The apparatus of claim 15, wherein the data storage devices are supported on a plurality of multi-device sleds retractable through the first end of the housing to facilitate a service event upon the storage devices supported thereon, wherein the airflow passes along channels between adjacent pairs of the sleds.

18. The apparatus of claim 16, wherein the airfoil comprises a rigid element having opposing first and second planar surfaces, the first planar surface extending at an acute angle with respect to the PCBA of the midplane to channel the airflow toward the at least one IC device.

19. The apparatus of claim 15, wherein the airfoil comprises a rigid planar member extending at an acute angle of nominally 45 degrees with respect to a length direction of the housing from the first end to the second end.

20. The apparatus of claim 15, further comprising an active element mounted to the airfoil opposite the control board.

* * * * *